United States Patent
Cagle et al.

(10) Patent No.: US 7,111,202 B2
(45) Date of Patent: Sep. 19, 2006

(54) AUTONOMOUS BOOT FAILURE DETECTION AND RECOVERY

(75) Inventors: John M. Cagle, Houston, TX (US); Daniel John Zink, Cypress, TX (US); James T. Bodner, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 10/184,140

(22) Filed: Jun. 28, 2002

(65) Prior Publication Data

US 2004/0078679 A1    Apr. 22, 2004

(51) Int. Cl.
*G06F 11/00*    (2006.01)

(52) U.S. Cl. .................. 714/36; 713/1; 713/2
(58) Field of Classification Search .......... 714/36; 713/1, 2
See application file for complete search history.

(56) References Cited

U.S. PATENT DOCUMENTS

| | | | |
|---|---|---|---|
| 5,214,695 A * | 5/1993 | Arnold et al. ................ 713/2 |
| 6,012,114 A | 1/2000 | Autor et al. ................ 710/103 |
| 6,311,232 B1 | 10/2001 | Cagle et al. .................. 710/8 |
| 6,314,516 B1 | 11/2001 | Cagle et al. .................. 713/1 |
| 6,446,091 B1 | 9/2002 | Noren et al. ................ 707/202 |
| 6,748,525 B1 * | 6/2004 | Hubacher et al. ............. 713/1 |
| 6,763,456 B1 * | 7/2004 | Agnihotri et al. ............. 713/2 |
| 2003/0014619 A1 * | 1/2003 | Cheston et al. .............. 713/1 |

* cited by examiner

*Primary Examiner*—Robert Beausoliel
*Assistant Examiner*—Yolanda L. Wilson

(57) ABSTRACT

The disclosed embodiments provide an efficient method and apparatus for avoiding hangs when a computer system is unable to complete a proper boot. Booting is attempted from each device in a standard boot order list until a successful boot occurs. If the standard boot order list is exhausted without a successful boot, the boot sequence is retried after a predetermined time period.

27 Claims, 3 Drawing Sheets

AUTONOMOUS BOOT FAILURE DETECTION AND RECOVERY

BACKGROUND OF THE INVENTION

1. Field of the Invention

This invention relates generally to improving operational efficiency in computer systems and, more particularly, to providing computers with the ability to automatically attempt to reboot after a failed boot attempt.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Modern computer networks come in all shapes and sizes. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment or even between groups of computers in different cities and countries. Such a configuration would typically include a large number of servers, each connected to numerous client computers.

Further, the arrangements of servers and clients in a larger network environment could be connected in any of an infinite number of topologies that may include local area networks ("LANs"), wide area networks ("WANs") and municipal area networks ("MANs"). In these larger networks, a problem with any one server computer (for example, a failed bard drive, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed without intervention by the network management team that maintains the network. Operations that require manual intervention, such as manually rebooting a group of computers that have failed an initial boot operation and have become hung, are extremely labor intensive and time consuming.

An example of such a situation may arise when the software of a large number of geographically dispersed server computers is upgraded, requiring all of the upgraded server computers to reboot. Upon reboot, each server has a list of storage devices from which it will attempt to boot (load an OS) in a specified order. This list may be referred to as a "standard boot order" list. For example, the standard boot order list for a given server may be as follows: network drive, floppy drive, CD ROM drive, system hard drive. The standard boot order is configurable by the network management team and typically reflects the preferred boot order based on the topology and capabilities of the individual network. Many modern networks have the capability to boot over a network connection using an industry standard such as the Pre-boot eXecution Environment ("PXE" (pronounced "pixie")) or the like. Other standards that support booting over a network connection include iSCSI and BOOTP/TFTP.

When a server is rebooted, its basic input-output system ("BIOS"), which is the low level programming that initializes the computer, examines the standard boot order list and attempts to boot from the first device on the list. In so doing, the BIOS executes a portion of BIOS code commonly referred to as the interrupt 19 (or "INT 19") handler. The INT 19 handler attempts to read the master boot record ("MBR") of the device that is first on the list in the standard boot order list of the server. If the MBR is valid, the server will attempt to boot from that device. If the MBR is not valid or if the server is unable to boot from the specified device for other reasons, program flow returns to a section of the BIOS typically referred to as the interrupt 18 (or "INT 18") handler, which signifies that a boot attempt has failed. Examples of reasons that may prevent a proper boot from a selected media even if the MBR is valid are (1) no system files on the selected media, (2) corrupt partition table on the selected media, or (3) no partition table on the selected media.

The BIOS continues execution by attempting to boot from the next device on the standard boot order list. Under control of the BIOS, the server continues to try to boot from each device in the standard boot order list until it finds a device that has a valid MBR and no other issues preventing a proper boot. If the BIOS reaches the end of the standard boot order list and no successful boot has occurred, the server hangs or ceases operation. A message such as "No System Disk" or the like is displayed and user intervention is required to retry booting the server.

As is readily apparent, user intervention in the form of physically going from computer to computer and rebooting each hung server manually by providing a disk with a valid OS could be very time consuming. This is particularly true when servers are operating in a "headless" environment. Headless servers are servers that are not equipped with display monitors, mice and keyboards. Rebooting headless servers may involve connecting additional hardware to the server or accessing the server through a remote server management tool. In the meantime, users of the network may be idled and unable to access network resources.

There are many reasons that could cause a large number of computers to fail a mass reboot attempt with many servers becoming hung and in need of manual user intervention. If the server computers are trying to obtain their operating system ("OS") over a network connection, the reboot attempt could fail because the network connection is not available when reboot is attempted. Another reason the initial boot attempt might fail is if the network server containing the OS on the network is temporarily unavailable when the boot attempt is performed. Also, individual server computers could fail to reboot because they could have other problems independent of network conditions. Servers which are infrequently rebooted could suffer from an inordinately long hard drive spin-up time. Such servers may fail an initial boot attempt and be hung because their hard drive does not spin up fast enough. These causes may combine to leave a large number of server computers in an unusable state requiring physical user intervention after a mass boot attempt. A way to avoid having a large number of computers requiring user intervention after a failed boot attempt is desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
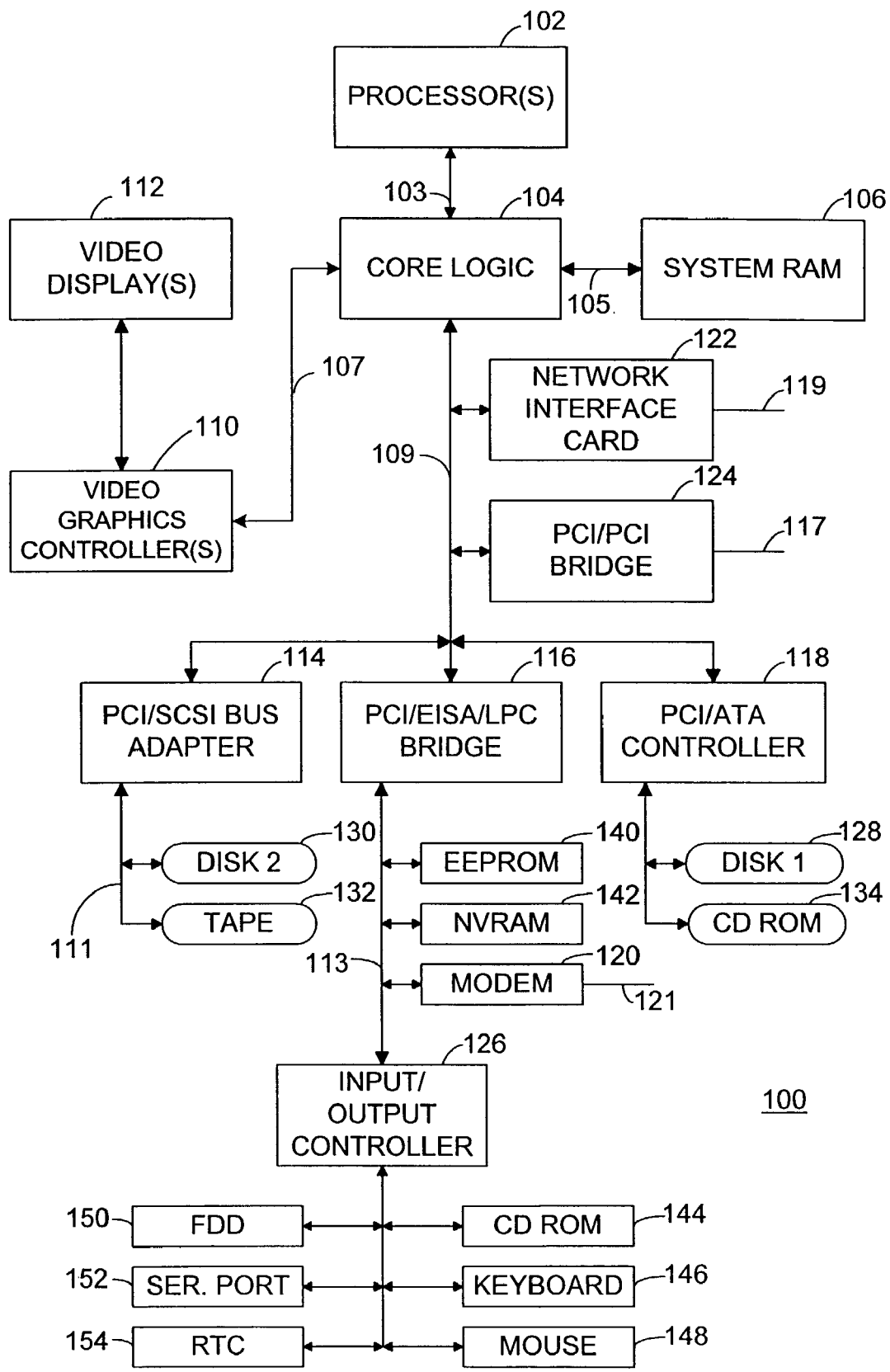
FIG. 1 is a block diagram illustrating a computer system in which the present invention may be practiced.

Referring now to FIG. 1, a schematic block diagram of a computer system utilizing the present invention is illustrated. A computer system is generally indicated by the numeral 100 and comprises a processor (or processor complex comprising multiple central processing units) 102. Also included in the computer system 100 are core logic 104 (or north bridge), system random access memory ("RAM") 106, a video graphics controller(s) 110, a video display(s) 112, a PCI/SCSI bus adapter 114, a PCI/EISA/LPC bridge 116, and a PCI/ATA controller 118. A hard drive 128 and CD ROM drive 134 may be connected to the PCI/ATA controller 118.

Single or multilevel cache memory (not illustrated) may also be included in the computer system 100 according to the current art of microprocessor computer systems. If the computer system 100 includes multiple processors, they may be arranged in a symmetric or asymmetric multiprocessor configuration.

The processor 102 is connected to the core logic 104 through a host bus 103. The system RAM 106 is connected to the core logic 104 through a memory bus 105. The configuration registers of the computer system may be incorporated into the processor or in the system RAM 106 (or some combination of the two). The configuration registers may be designed to control the operation of many of the system components shown in FIG. 1.

The video graphics controller(s) 110 is connected to the core logic 104 through an AGP bus 107 (or other bus for transporting video data). The PCI/SCSI bus adapter 114, PCI/EISA/LPC bridge 116, and PCI/ATA controller 118 are connected to the core logic 104 through a primary PCI bus 109. Those of ordinary skill in the art will appreciate that a PCI-X bus or Infiniband bus may be substituted for the primary PCI bus 109. The specific protocol of the bus 109 is not a crucial aspect of the present invention.

Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated). The PCI/PCI bridge 124 provides an additional PCI bus 117.

Hard disk 130 and tape drive 132 are connected to the PCI/SCSI bus adapter 114 through a SCSI bus 111. The NIC 122 is connected to a local area network 119. The PCI/EISA/LPC bridge 116 connects over an EISA/LPC bus 113 to a Electrically Erasable Random Access Memory ("EEPROM") 140, a non-volatile random access memory (NVRAM) 142, a modem 120, and an input-output controller 126. The EEPROM 140 may store the system BIOS and may include flash memory. The NVRAM 142 may store system configuration settings and the like. The NVRAM 142 may include a programmable logic array ("PAL") or any other type of programmable non-volatile storage. The modem 120 connects to a telephone line 121. The input-output controller 126 interfaces with a keyboard 146, CD-ROM drive 144, mouse 148, floppy disk drive ("FDD") 150, serial/parallel ports 152 and a real time clock ("RTC") 154. The EISA/LPC bus 113 is a slower information bus than the PCI bus 109, but it costs less to interface with the EISA/LPC bus 113.

Figure 2:
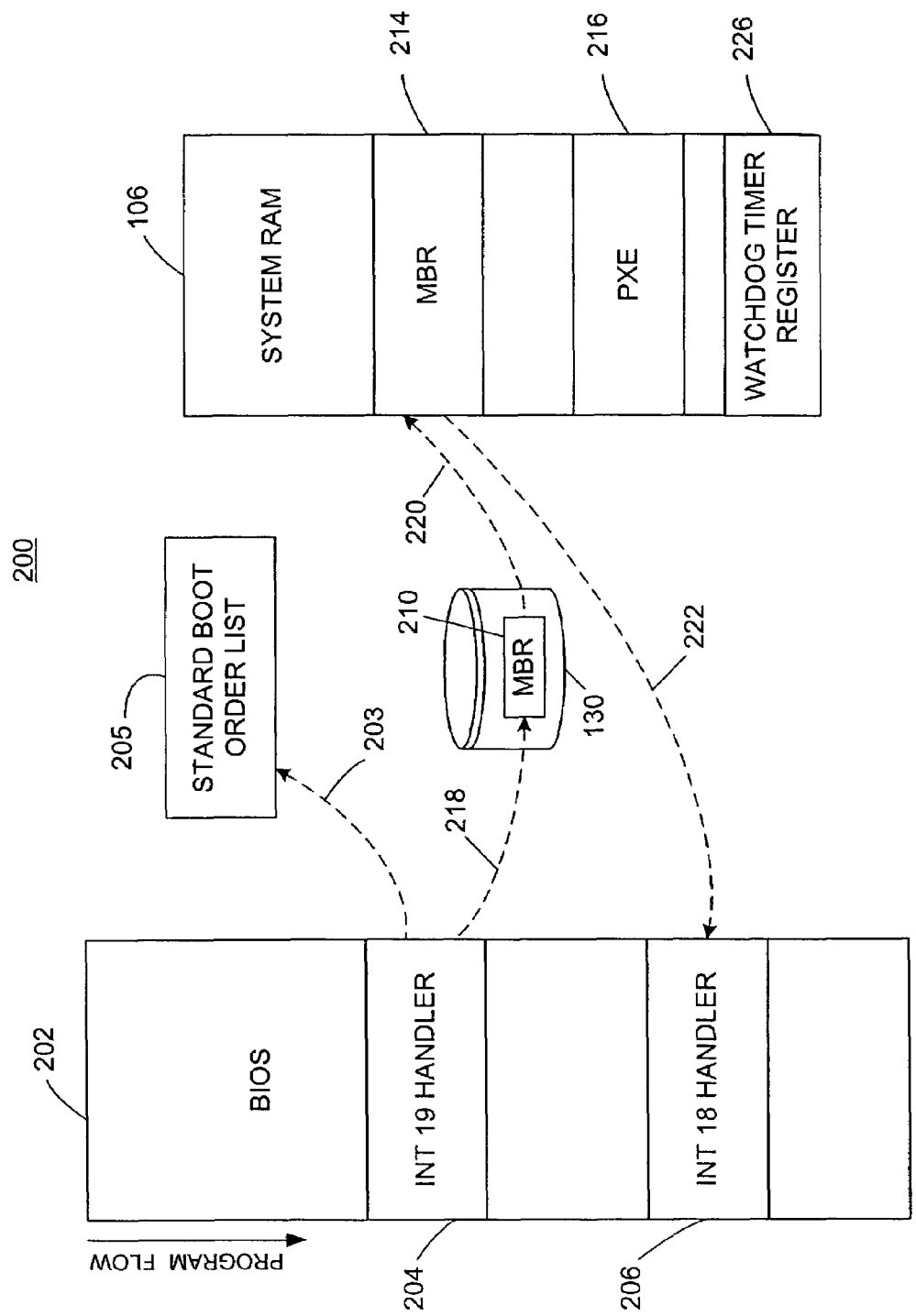
FIG. 2 is a representational diagram that is useful in explaining the operation of the present invention.

FIG. 2 is a representational diagram that is useful in explaining the operation of the present invention. The diagram is generally identified by reference numeral 200. System BIOS 202 may be stored in EEPROM 140 (FIG. 1). The computer system 100 (FIG. 1) attempts to boot an operating system ("OS") when it is powered on or when it is manually directed to boot by a user.

The first step in the process of booting an OS is that the system BIOS 202 begins to execute. The BIOS 202 initializes the hardware of the computer system 100 (FIG. 1) and performs a power-on self test ("POST") to make sure system components are functioning normally. Subsequently, an INT 19 handler 204, which is a portion of the BIOS 202 designed to boot an OS, begins execution. The INT 19 handler 204 accesses a standard boot order list 205 that is typically stored in the EEPROM 140 (FIG. 1). The accessing of the standard boot order list 205 is indicated in FIG. 2 by the dashed arrow 203. Next, the BIOS 202 attempts to load a master boot record ("MBR") from the first device listed in the standard boot order list 205.

The first device specified by the standard boot order list 205 is accessed and a copy of the MBR stored on that device is loaded into the system RAM 106. In the example shown in FIG. 2, the system BIOS first loads an MBR 210 from the system hard drive 130. This operation is indicated by the dashed arrow 218 in FIG. 2. The loading of a copy of the MBR 210 into system RAM 106 is indicated by the dashed arrow 220. The copy of the MBR that has been loaded into system RAM is indicated by reference numeral 214.

After the MBR is loaded into system RAM 106, it is tested for validity. If the MBR is valid, the MBR copy 214, which is executable code, begins execution. The purpose of the MBR is to actually load the OS code from the device on which the MBR was stored. If the MBR is determined to be invalid, program flow passes back to an area of system BIOS code known as the interrupt 18 ("INT 18") handler 206. The INT 18 handler is responsible for responding to a failed boot attempt. Passage of program control from the MBR copy 214 to the INT 18 handler 206 is indicated by dashed arrow 222.

After program control is passed to the INT 18 handler, the next successive device listed in the standard boot order list 205 is identified and a boot from that device is attempted. One of the devices in the standard boot order list 205 may be a network device. In that case, PXE code 216 may be loaded from a storage device into system RAM 106 and executed to attempt to boot from the device on the network. If the computer system 100 (FIG. 1) is unable to boot from the network, program flow passes from the PXE code 216 to the INT 18 handler 206 as described above.

In a standard boot process, each device in the standard boot order list is tried in succession until one of the devices boots properly. If all devices in the standard boot order list 205 are tried and no successful boot has taken place, the system BIOS may be designed to wait for a predetermined period and reinitialize the entire boot sequence from the beginning of the standard boot order list 205. This may be accomplished by implementing a watchdog timer register 226, which may be located in the system RAM 226. The watchdog timer register 226 may be set up to count down over a predetermined time unless it is reset by a successfully booted OS. If the watchdog timer register 226 is not reset within a predetermined time (for example, 5 seconds) after attempting to boot an OS from one of the devices on the standard boot order list 205, the BIOS may interpret the expiration of the watchdog timer as an indication that the OS was not successfully booted. In that case, the system BIOS 202 may be programmed to restart the boot process. The system BIOS 202 may also display a message to the user that the initial boot process failed and a second (or successive) boot process is going to begin.

In the second (or successive) boot sequence, a device that previously failed to support a proper boot may be able to support a proper boot for a variety of reasons. If the device that did not support a proper boot in a previous attempt is a network device, it could be that the network connection to the device was not available in the previous boot attempt. The device may be accessible in the second boot attempt. Similarly, if a hard drive failed in the previous boot attempt, it could be that the hard drive had not had time to spin up correctly when it was first tried. The hard drive may be functioning correctly when it is retried a second (or successive) time. In this manner, the computer system may be successfully booted after a failed initial boot sequence attempt.

Figure 3:
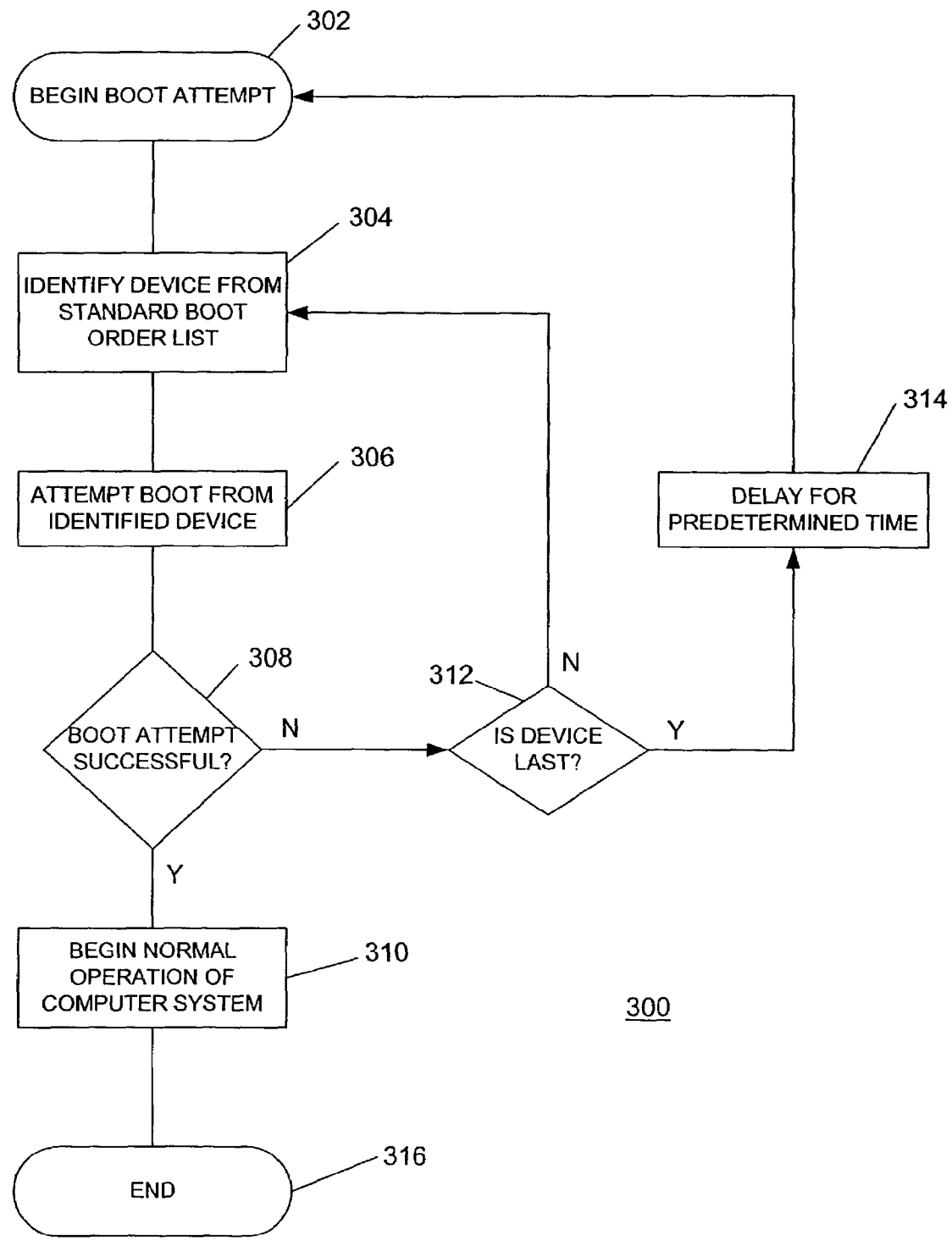
FIG. 3 is a process flow diagram illustrating the operation of an embodiment of the present invention.

FIG. 3 is a process flow diagram illustrating the operation of an embodiment of the present invention. The process is generally referred to by the reference numeral 300.

At 302, an initial boot sequence begins. The initial boot attempt occurs when the computer system 100 (FIG. 1) is first powered on or it may be initiated by a remote user using a remote management console or the like in a networked environment. At 304, the system BIOS accesses the standard boot order list 205 (FIG. 2) and identifies the first device on the list. The BIOS attempts to boot from the identified device at 306. If the boot is successful (decision 308), then normal operation of the computer begins at 310 and the boot process terminates at 316.

If the boot attempt is not successful (decision 308), the system BIOS determines if the device that just attempted to boot was the last device in the standard boot order list 205 (FIG. 2). If the device that just attempted the boot was not the last device on the standard boot order list 205, program flow returns to 304 where the next device in the standard boot order list 205 is identified. If the last device from which a boot was attempted is the last device in the standard boot order list 205, the BIOS 202 (FIG. 2) delays for a predetermined time at 314. The BIOS 202 (FIG. 2) may optionally display a message that a boot sequence has just failed and that a new boot sequence will be tried. Finally, the BIOS 202 continues execution and begins a new boot sequence at 302.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system comprising:
    a processor adapted to execute program instructions;
    a standard boot order list that identifies a plurality of devices from which to attempt to boot an operating system;
    a system BIOS containing program instructions adapted to be executed by the processor, the system BIOS adapted to:
        read the standard boot order list to identify a first one of the plurality of devices;
        attempt to boot from the first one of the plurality of devices;
        if the attempt to boot from the first one of the plurality of devices is unsuccessful, successively attempting to boot from subsequent devices of the plurality of devices until the boot order list is exhausted or a successful boot is completed; and
        if the boot order list is exhausted with no successful boot attempt, successively and continuously attempting to boot from the plurality of devices contained in the boot order list without external intervention.

2. The computer system of claim 1 wherein the system BIOS is adapted to re-read the standard boot order list before attempting to boot from one of the plurality of devices a second time.

3. The computer system of claim 1 wherein at least one of the plurality of devices is accessible through a network connection.

4. The computer system of claim 3 wherein the network connection is accessible using the Pre-boot eXecution Environment standard.

5. The computer system of claim 1 wherein at least one of the plurality of devices is a hard drive.

6. The computer system of claim 1 wherein at least one of the plurality of devices is a CD ROM drive.

7. The computer system of claim 1 wherein at least one of the plurality of devices is a floppy disk drive.

8. The computer system of claim 1 wherein the system BIOS is adapted to delay for a predetermined time period before attempting to boot from the first one of the plurality of devices a second time.

9. The computer system of claim 1 wherein the system BIOS is adapted to display a message indicating that a boot sequence has failed before attempting to boot from the first one of the plurality of devices a second time.

10. A computer readable medium having computer readable instructions stored thereon, said computer readable instruction comprising:
    code adapted to read a standard boot order list to identify a first one of the plurality of devices from which to attempt to boot an operating system;
    code adapted to attempt to boot from the first one of the plurality of devices;
        code adapted to successively attempt to boot from subsequent devices of the plurality of devices until the boot order list is exhausted or a successful boot is completed, if the attempt to boot from the first one of the plurality of devices is unsuccessful; and
        adapted to successively and continuously attempt to boot from the plurality of devices contained in the boot order list without external intervention, if the boot order list is exhausted with no successful boot attempt.

11. The computer readable medium of claim 10, comprising code adapted to re-read the standard boot order list before attempting to boot from one of the plurality of devices a second time.

12. The computer readable medium of claim 10 comprising code adapted to access at least one of the plurality of devices through a network connection.

13. The computer readable medium of claim 12 wherein the network connection is accessible using the Pre-boot eXecution Environment standard.

14. The computer readable medium of claim 10 wherein at least one of the plurality of devices is a hard drive.

15. The computer readable medium of claim 10 wherein at least one of the plurality of devices is a CD ROM drive.

16. The computer readable medium of claim 10 wherein at least one of the plurality of devices is a floppy disk drive.

17. The computer readable medium of claim 10 comprising code is adapted to delay for a predetermined time period before attempting to boot from the first one of the plurality of devices a second time.

18. The computer readable medium of claim 10 comprising code adapted to display a message indicating that a boot sequence has failed before attempting to boot from the first one of the plurality of devices a second time.

19. A method of booting an operating system in a computer system, the method comprising the acts of:
    accessing a standard boot order list to identify a plurality of devices from which to attempt to boot;
    attempting to boot from a first one of the plurality of devices;
    if the attempting to boot from the first one of the plurality of devices is unsuccessful, successively attempting to boot from subsequent devices of the plurality of devices until the boot order list is exhausted or a successful boot is completed and if the boot order list is exhausted with no successful boot attempt,
        successively and continuously attempting to boot from the plurality of devices contained in the boot order list without external intervention.

20. The method claim 19, wherein the act of determining further comprises the act of reading the standard boot order list to see if any additional devices are listed in the standard boot order list.

21. The method of claim 19 further comprising the act of accessing the plurality of devices through a network connection.

22. The method of claim 21 wherein the network connection is accessible using the Pre-boot eXecution Environment standard.

23. The method of claim 19 wherein at least one of the plurality of devices is a hard drive.

24. The method of claim 19 wherein at least one of the plurality of devices is a CD ROM drive.

25. The method of claim 19 wherein at least one of the plurality of devices is a floppy disk drive.

26. The method of claim 19, further comprising the act of delaying for a predetermined time period before attempting to boot from the first one of the plurality of devices a second time.

27. The method of claim 19, further comprising the act displaying a message indicating that a boot sequence has failed before attempting to boot from the first one of the plurality of devices a second time.

* * * * *